(12) United States Patent
Idupunur et al.

(10) Patent No.: US 9,646,501 B2
(45) Date of Patent: May 9, 2017

(54) SYSTEM AND METHOD FOR INTEGRATING TEMPORAL DATA INTO FLIGHT MANAGEMENT SYSTEMS

(71) Applicant: HONEYWELL INTERNATIONAL INC., Morristown, NJ (US)

(72) Inventors: Krishna Idupunur, Andhra Pradesh (IN); Murali Kusuma, Andhra Pradesh (IN); Amit Srivastav, Karnataka (IN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 14/799,097

(22) Filed: Jul. 14, 2015

(65) Prior Publication Data

US 2017/0018191 A1  Jan. 19, 2017

(51) Int. Cl.
G08G 5/00 (2006.01)

(52) U.S. Cl.
CPC ........... G08G 5/003 (2013.01); G08G 5/0004 (2013.01); G08G 5/0047 (2013.01)

(58) Field of Classification Search
CPC ..... G08G 5/003; G08G 5/0047; G08G 5/0004
See application file for complete search history.

(56) References Cited

U.S. PATENT DOCUMENTS

| | | | |
|---|---|---|---|
| 8,024,078 | B2 | 9/2011 | Coulmeau et al. |
| 8,046,165 | B2 | 10/2011 | Sacle et al. |
| 8,200,378 | B1 | 6/2012 | Chiew et al. |
| 8,502,701 | B2 | 8/2013 | Goh et al. |
| 8,831,795 | B2 | 9/2014 | Cabos |
| 2008/0140727 | A1 | 6/2008 | Pschierer |
| 2010/0241670 | A1 | 9/2010 | Justice et al. |
| 2011/0246176 | A1 | 10/2011 | Arasada |
| 2011/0264313 | A1 | 10/2011 | Sampath |
| 2012/0209458 | A1 | 8/2012 | Sampath |
| 2013/0027226 | A1 | 1/2013 | Cabos |
| 2013/0278444 | A1 | 10/2013 | Venkataswamy et al. |
| 2013/0285555 | A1 | 10/2013 | Kumetz, Jr. et al. |

FOREIGN PATENT DOCUMENTS

| | | |
|---|---|---|
| WO | 2011128835 A2 | 10/2011 |
| WO | 2011128836 A2 | 10/2011 |

OTHER PUBLICATIONS

Sindlinger, A. et al.; Automated NOTAM Processing for a Graphical and Textual Integration on Data Link Equipped Aircraft; 2010 Integrated Communications Navigation and Surveillance (ICNS) Conference May 11-13, 2010.
Extended EP Search Report for Application No. 16178279.2-1557 dated Nov. 29, 2016.

*Primary Examiner* — Russell Frejd
(74) *Attorney, Agent, or Firm* — Lorenz & Kopf, LLP (57) ABSTRACT

The embodiments described herein can provide systems and methods for combining traditional navigational data with temporary updates. Such a system and method can facilitate the inclusion of temporary navigational events into the navigational data made available on aircraft flight management system (FMS). For example, the systems and methods can be used to combine Aeronautical Information Regulation and Control (AIRAC) navigational data that is traditionally updated on 28 day cycles, with temporary navigational data changes, such as those typically indicated in "Notices to Airmen" (NOTAM). The combined navigational dataset can then be provided to the FMS.

20 Claims, 4 Drawing Sheets

SYSTEM AND METHOD FOR INTEGRATING TEMPORAL DATA INTO FLIGHT MANAGEMENT SYSTEMS

TECHNICAL FIELD

Embodiments disclosed herein relate generally to flight management systems, more particularly, to navigational data provided by flight management systems.

BACKGROUND

On modern aircraft, flight management systems (FMS) are specialized computer systems that automate a variety of flight related tasks. For example, flight management systems are used to guide the aircraft along a flight plan. A typical flight management system includes a navigational database that includes the information needed for the flight plan. Such a navigational database can include information on airports, runways, waypoints, airways, holding patterns, etc.

Commercial aircraft commonly use navigation databases designed to meet requirements defined by an Aeronautical Information Regulation and Control (AIRAC) standard, as developed by the International Civil Aviation Organization (ICAO). The AIRAC standard specifies that navigational databases are to be updated at the end of a 28 day period known as an "AIRAC cycle". Specifically, during each 28 day cycle the various countries provide updates to their aeronautical information, and the navigational database suppliers are to provide corresponding updates to their databases that include any new aeronautical information, with the updated navigational databases delivered to aircraft at the end of the cycle for use by the flight management systems during the next 28 day cycle.

One issue with the AIRAC standard and the use of the 28 day cycle is it that does not readily facilitate updates to the navigational database for temporary changes outside of the 28 day update cycle. For this reason it is very common for the navigational database to be out of date with respect to temporary changes.

As one example, countries can publish updates to their aeronautical information in the form "Notices to Airmen", usually referred to as "NOTAMs". These NOTAMs are typically issued to alert pilots of any temporary changes or hazards. For example, in the United States, NOTAMs are available at the Federal Aviation Administration's National Airspace System Aeronautical Information Management Enterprise System (NAIMES) PilotWeb NOTAM System located on the internet the Federal Aviation Administration (FAA) website. These NOTAMs can be published at any time during the 28 day AIRAC cycle. Traditionally, pilots have received these NOTAMs in paper or electronic form, and the pilots have been required to manually determine what information included in the NOTAM may be relevant to their specific flight plan.

There thus remains a continuing need for improvements in aircraft navigation, specifically, a need to provide improved integration between navigational databases and temporary changes such as those indicated by NOTAMs.

BRIEF SUMMARY

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

In general, the embodiments described herein provide system and methods for combining traditional navigational data with temporary updates and changes. For example, the systems and methods can be used to combine Aeronautical Information Regulation and Control (AIRAC) navigational data that is traditionally updated on 28 day cycles, with temporary navigational changes, such as those typically indicated in "Notices to Airmen" (NOTAM). This merging of data can provide a combined navigational database that can be uploaded to aircraft flight management systems, thus assuring that these flight management systems have both the current AIRAC data and any temporal data indicated in the relevant NOTAMs.

In one embodiment, an apparatus is provided, comprising: a processor; a memory coupled to the processor; a program residing in the memory and being executed by the processor, the program including: a navigational data comparator module, the navigational data comparator module configured to receive cyclical navigational data and temporal data, the navigational data comparator module configured to compare temporal navigational elements in the temporal data to the cyclical navigational data to determine if the temporal navigational elements are new, extending, or ending; and a temporal record generator module, the temporal record generator module coupled to the navigational data comparator module and configured to create temporal records from the temporal navigational elements, the created temporal records including; a temporal record for a temporal period for each new temporal navigational element, a temporal record for a current cycle and a temporal record for the temporal period for each extending temporal navigational element, and a temporal record for the current cycle for each ending temporal navigational element.

In another embodiment, a system for generating datasets for flight management systems is provided, the system comprising: a navigational data comparator, the navigational data comparator configured to receive cyclical navigational data and a plurality of temporal data, each of the plurality of notices including a temporal navigational event, the navigational data comparator configured to compare specified features of the temporal navigational elements in the temporal data to the specified features of the cyclical navigational data to determine if the temporal navigational elements are new for a temporal period, extending to the temporal period, or ending before the temporal period; a temporal record generator, the temporal record generator configured to create temporal records, the created temporal records including: a temporal record only for the temporal period for new temporal navigational elements; a temporal record valid for a current cycle previous to the temporal period and a temporal record for the temporal period for extending temporal navigational elements; and a temporal record only for the current cycle for ending temporal navigational elements; a temporal dataset refresher, the temporal dataset refresher configured to receive the created temporal records and generate a temporal navigational dataset from the temporal records, where the temporal navigational dataset comprises data for the current cycle and the temporal period; a non-temporal dataset refresher, the non-temporal dataset refresher configured to receive the cyclical navigational data and generate a non-temporal navigational dataset from the cyclical navigational data, where the non-temporal navigational dataset comprises data for a previous cycle and the current cycle; and a navigational dataset combiner, the navigational dataset combiner configured to receive the non-temporal navigational dataset and the temporal navigational dataset and merge the non-temporal navigational dataset and the temporal navigational dataset to generate a combined navigational dataset, with each navigational data element in the combined navigational dataset including a corresponding cycle indicator to indicate if the navigational data element corresponds to the previous cycle, the current cycle, or the temporal period, and wherein the combined navigational dataset is formatted for delivery to a flight management system (FMS) aboard an aircraft.

In another embodiment, a method is provided comprising: providing cyclical navigational data and temporal data, the temporal data including temporal navigational elements; comparing the temporal navigational elements in the temporal data to the cyclical navigational data; determining if the temporal navigational elements are new, extending or ending based on the comparing; creating temporal records for a temporal period for new temporal navigational elements; creating temporal records for a current cycle previous to the temporal period and temporal records for the temporal period from the temporal data for extending temporal navigational elements; and creating temporal records for the current cycle for ending temporal navigational elements.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

In general, the embodiments described herein provide systems and methods for combining traditional navigational data with temporary updates. Such a system and method can facilitate the inclusion of temporary navigational events into the navigational data made available on aircraft flight management system (FMS). For example, the systems and methods can be used to combine Aeronautical Information Regulation and Control (AIRAC) navigational data that is traditionally updated on 28 day cycles, with temporary navigational data changes, such as those typically indicated in "Notices to Airmen" (NOTAM). The combined navigational dataset can then be provided to the FMS. With the FMS loaded with both cyclical and temporary data, the pilot can be provided with both comprehensive and up to date aeronautical information.

Figure 1:
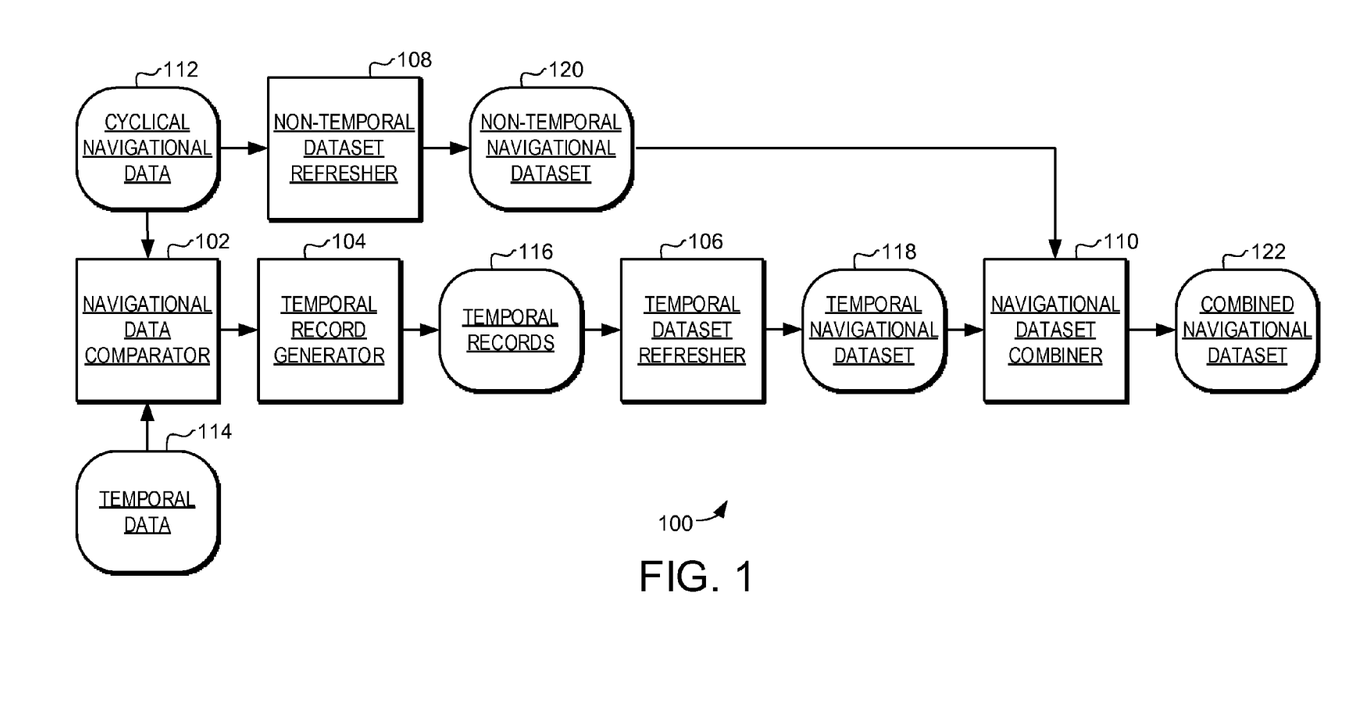
FIG. 1 is a schematic diagram of a navigational data system in accordance with an exemplary embodiment.

Turning now to FIG. 1, an exemplary navigational data system 100 is illustrated. The navigational data system 100 includes a navigational data comparator 102, a temporal record generator 104, a temporal dataset refresher 106, a non-temporal dataset refresher 108, and a navigational dataset combiner 110. The navigational data system 100 receives cyclical navigational data 112, temporal data 114, and generates temporal records 116, temporal navigational dataset 118, non-temporal navigational dataset 120, and combined navigational dataset 122.

In general, the navigational data system 100 is configured to generate the combined navigational dataset 122, which is then provided to the FMS. The combined navigational dataset 122 is configured to include multiple cycles of data, and thus allows the multiple cycles of data to be delivered and loaded on the FMS at once. Additionally, this multiple cycle configuration allows the combined navigational dataset 122 to include temporal data elements that may change (e.g., added, updated, or deleted) across one or more cycles uploaded to the FMS.

As one example, the combined navigational dataset 122 can include both navigational data for a first cycle (e.g., a previous cycle that is valid until a transition) and a second cycle (e.g., a current cycle that will become valid at the transition). Because the combined navigational dataset 122 includes both data for the previous cycle and the current cycle, the combined navigational dataset 122 can be delivered and loaded on an FMS during the previous cycle and in advance of the start of the current cycle. Thus, the FMS can always have cyclical data that is up to date and ready for use.

Furthermore, in accordance with the embodiments described herein, the combined navigational dataset 122 will also include temporal navigational elements derived from temporal data 114. Specifically, temporal navigational elements corresponding to a specified temporal period are derived from the temporal data 114 and combined with cyclical navigational data 112. In general, this defined temporal period is configured to overlap the current cycle and would be selected to include temporal data elements that may change (e.g. add, update, delete) for the current cycle. Thus the combined navigational dataset 122 will include the temporal navigational elements corresponding to a specified temporal period, and the cyclical data for both the previous cycle and the current cycle. This combined navigational dataset 122 can loaded into the FMS to provide the pilot with both up to date cyclical data and temporal data corresponding to the defined period.

To facilitate the combination of cyclical navigational data 112 and the temporal data 114, the navigational data comparator 102 is configured to compare those temporary navigational elements to corresponding navigational features in the cyclical navigational data 112 to determine if the temporal navigational elements are new, extending, or ending, in relation to a defined temporal period that overlaps the current cycle. Specifically, those temporary navigational elements that only become valid during the temporal period are identified as a "new". Those temporal navigational elements that were valid previous to the defined temporal period and extend into the defined temporal period are identified as "extending". And those temporal navigational elements that were valid previous to the defined temporal period and end before the defined temporal period are identified as "ending".

In one embodiment, this comparison is limited to features that correspond to specified events in the temporal data 114 which are relevant to the cyclical navigational data 112. Such specified event features can include categories such as aerodome closures, runway closures, route portion closures, navaid unserviceable, new obstacles, and special activity area activations. Specified event feature data from temporal data 114 will be compared against feature data in cyclical navigational data 112. For example, if the temporal data relates to special activity area activation, then the activation feature data available in temporal data 114 for the airspace can be compared against the activation event feature in cyclical navigational data 112 for that airspace.

In another embodiment, this comparison is of cyclical navigational data 112 and temporal data 114 is performed for a defined temporal period. In such an embodiment the navigational data comparator 102 would be configured to compare only those temporary navigational elements that are valid during the defined temporal period, and thus would only identify those elements in that period. Such a comparison could compare only those temporary navigational elements that are valid for the entire defined temporal period. In another embodiment this comparison is of cyclical navigational data 112 and temporal data 114 for a specified geographic area. In such an embodiment only those temporal navigational elements corresponding to the specified geographic area would be compared.

The results of this comparison are provided to the temporal record generator 104. Based on this comparison, the temporal record generator 104 is configured to create temporal records 116 that correspond to the identified temporal navigational elements. The temporal records 116 that are created for each identified temporal navigation element will depend on what period of time the identified temporal navigational elements will be valid for, that is whether the temporal navigational elements are new, extending or ending.

Specifically, for those "new" temporal navigational elements that only become valid during the temporal period, the temporal record generator 104 will create temporal records only for the temporal period. Likewise, for those "extending" temporal navigational elements that were valid previous to the defined temporal period and extend into the defined temporal period, the temporal record generator 104 will create temporal records for both the current cycle and the temporal period. Finally, for those "ending" temporal navigational elements that were valid previous to the defined temporal period and end before the defined temporal period, the temporal record generator will create only temporal records for the current cycle.

Stated another way, because new temporal navigational elements would not be valid for the current cycle but instead its only valid for the temporal period, the temporal record generator 104 would only create a temporal record for the temporal period. Likewise, because extending temporal navigational elements would be valid for both the current cycle and the temporal period, the record generator 104 would create temporal records for both the current cycle and the temporal period. Finally, because ending temporal navigational elements would be valid for the current cycle but not valid for the temporal period, the temporal record generator 104 would only create a temporal record for the current cycle and not for the temporal period.

In one embodiment the cyclical navigational data 112 can be derived from AIRAC data. As described above, AIRAC data uses a 28 day update cycle. Thus, in this embodiment the combined navigational dataset 122 would include AIRAC data for a previous 28 day update cycle and for the current 28 day input cycle. An example of how the cyclical navigational data 112 can be derived from the AIRAC data will be described with reference to FIG. 3. Also, in one embodiment the temporal data 114 can be derived from digital NOTAMs. An example of how the temporal data 114 can be derived from digital NOTAMS will also be described with reference to FIG. 3. Thus, in this embodiment the combined navigational dataset 122 would include digital NOTAM data for the temporal period.

The temporal dataset refresher 106 is configured to receive the temporal records 116 and generate the temporal navigational dataset 118 from the temporal records 116. In general, the temporal dataset refresher 106 generates the temporal navigational dataset 118 into a two cycle format using cycle indicator field such as 'B' or 'N' or 'O'. Temporal navigational dataset record with cycle indicator field 'B' indicates that, this record is valid for both the current cycle and temporal period. In this context, temporal navigational dataset record with cycle indicator field 'N' indicates that, this record is valid for temporal period. Temporal navigational dataset record with cycle indicator field 'O' indicates that, this record is valid for current cycle. In one embodiment, the temporal dataset refresher 106 formats the temporal navigational dataset 118 into a two cycle format, with the data from the temporal records 116 formatted into data for the current cycle and the temporal period.

The non-temporal dataset refresher 108 is configured to receive the cyclical navigation data 112 and generate the non-temporal navigational dataset 120. In general, the non-temporal dataset refresher 108 generates the non-temporal navigational dataset 120 into a two cycle format using cycle indicator field such as 'B' or 'N' or 'O'. The non-temporal navigational dataset record with cycle indicator field 'B' indicates that, this record is valid for both the cycles which are previous cycle and current cycle. In this context, the non-temporal navigational dataset record with cycle indicator field 'N' indicates that, this record is valid for current cycle. The non-temporal navigational dataset record with cycle indicator field 'O' indicates that, this record is valid for previous cycle. In one embodiment, the non-temporal dataset refresher 108 formats the non-temporal navigational dataset 120 into a two cycle format, with the data from the cyclical navigation data 112 formatted into data for a previous cycle and a current cycle.

The navigational dataset combiner 110 is configured to receive the temporal navigation dataset 118 and the non-temporal navigational dataset 120. From this, the navigational dataset combiner 110 is configured to generate a combined navigational dataset 122 based on how the temporal features in the temporal navigational dataset 118 change (e.g. add, update, delete) the cyclical features in the non-temporal navigational dataset 120.

As noted above, the temporal navigational dataset 118 and the non-temporal dataset 120 are configured in the two cycle format, with each record in the two datasets including a cycle indicator field of 'B', 'N' or 'O'. For temporal features in the temporal navigational dataset 118 that do not impact the cyclical navigational data, the combined navigational dataset 122 will be created to include those temporal features with the appropriate cycle indicator field.

For temporal features in the temporal navigational dataset 118 that do impact the cyclical navigational data, the combined navigational dataset 122 will be created to include two cycle features with the appropriate cycle indicator field. So configured, the combined navigational dataset 122 can be delivered to a flight management system (FMS) aboard an aircraft.

Figure 2:
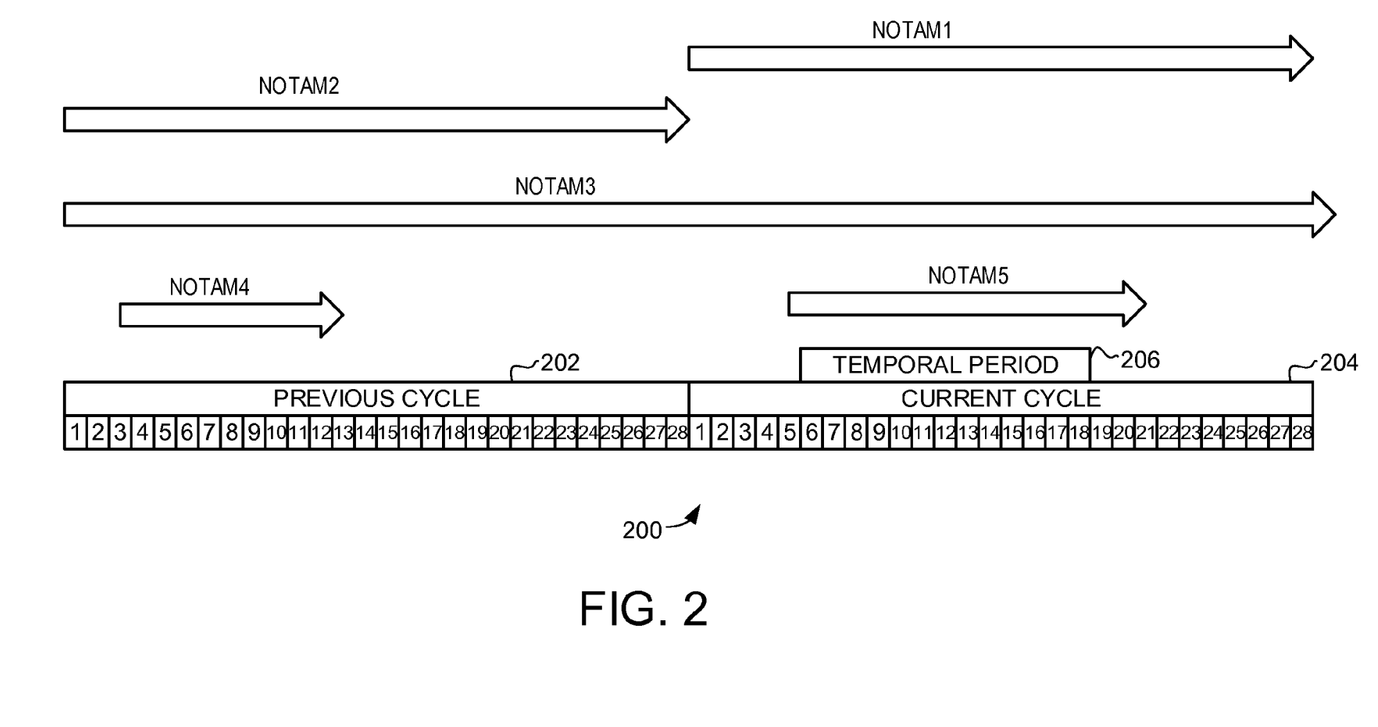
FIG. 2 is a schematic diagram of two cycle data in accordance with an exemplary embodiment.

Turning now to FIG. 2, a graphical representation of two cycles of navigation data 200 is illustrated schematically. The two cycles of navigation data 200 includes a previous cycle 202 and a current cycle 204, with both cycles being 28 days long. The previous cycle 202 and the current cycle 204 represent the two cycles of data that can be delivered and uploaded to the FMS according to the two cycle update process. Typically, countries will publish their data for the current cycle 204 early in the 28 day previous cycle 202. That data can then be processed by the database suppliers, delivered to the customers, and uploaded to the FMS in advance of the start of the current cycle 204. Because the navigation data 200 in this example includes two cycles of data, the navigation data 200 can be shipped and uploaded to the FMS at any time during the previous cycle 202 prior to current cycle 204, while assuring that the FMS has valid data for both the cycle that is currently active (i.e., the previous cycle 202) and the cycle that will be active next (i.e., current cycle 204).

FIG. 2 also illustrates an exemplary defined temporal period 206. This defined temporal period 206 overlaps with a portion of the current cycle 204. Specifically, in this illustrated example, the temporal period 206 overlaps from day 6 to day 18 of the current cycle 204. Again, this is just one example.

FIG. 2 also illustrates several exemplary temporal navigational elements, labeled NOTAM1, NOTAM2, NOTAM3, NOTAM4 and NOTAM5. Each of temporal navigational elements is exemplary of the type that can be provided as temporal data and combined into the navigational data dataset for upload to an FMS. For example, these temporal navigational elements can be provided as digital NOTAMS. In this illustrated example, each temporal navigational element is valid only over a portion of the two cycles. Specifically, NOTAM1 is valid over the entire current cycle 204. In contrast, NOTAM2 is valid over the entire previous cycle 202 but not the current cycle 204. Finally, NOTAM3 is valid over both the previous cycle 202 and the current cycle 204. NOTAM4 and NOTAM5 are valid only for potions of a cycle. Specifically, NOTAM4 is valid only for day 3 to day 13 of previous cycle 202, while NOTAM5 is valid from day 5 of the current cycle to day 21 of the current cycle.

As described above, in accordance with the embodiments described herein, the temporal navigational elements (e.g., NOTAM1-5) are selectively added to a combined navigational dataset. Specifically, those elements are selectively added based on their relationship with a defined temporal period (e.g., temporal period 206).

As one example, the defined temporal period could correspond to day 6 to day 18 of the current cycle 204. In such an example, NOTAM1, NOTAM3, and NOTAM5 will be added to the combined navigational dataset because these NOTAMs validity covers the entire defined temporal period.

Figure 3:
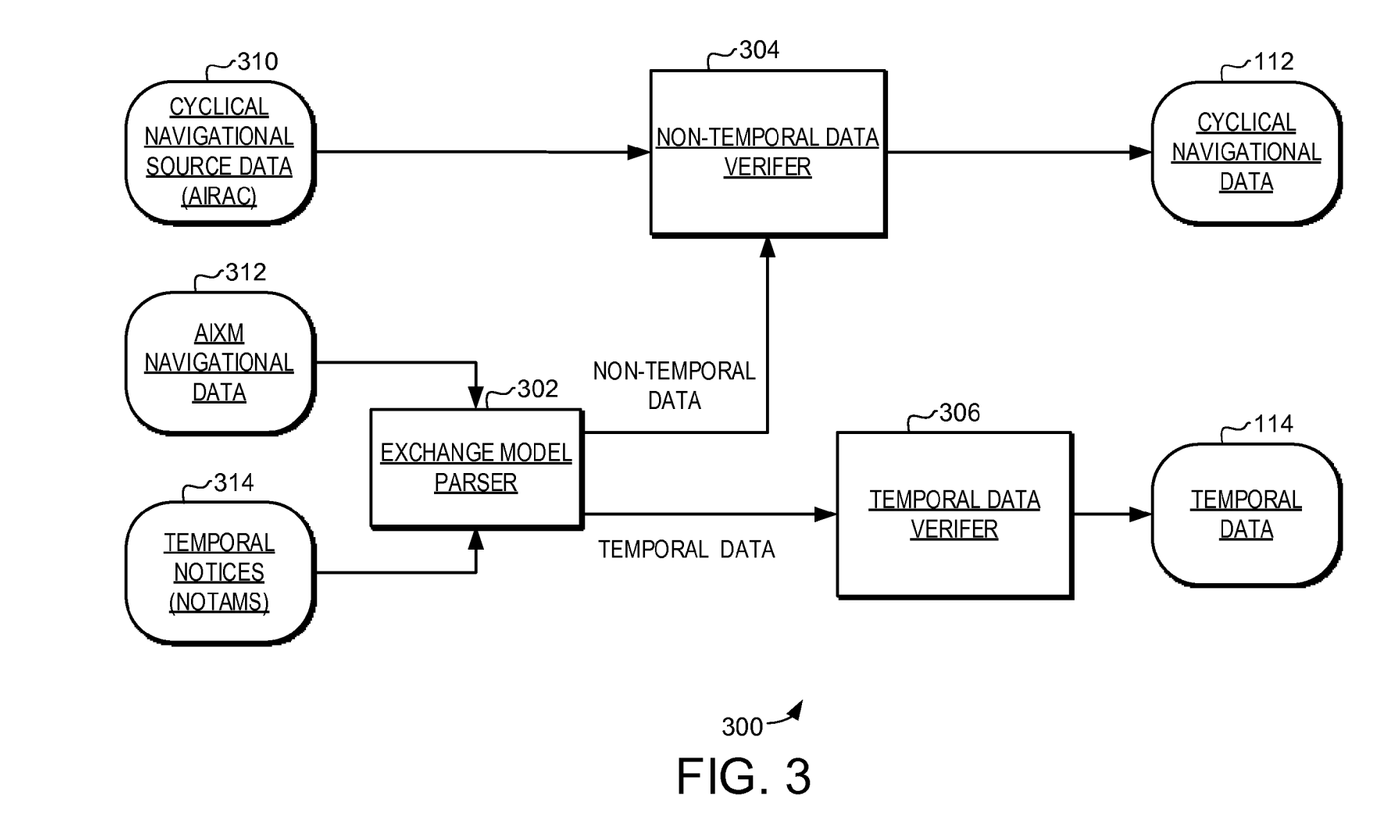
FIG. 3 is a schematic diagram of a navigational data processing system in accordance with an exemplary embodiment.

Turning now to FIG. 3, an exemplary navigational data processing system 300 is illustrated. In general, the data processing system 300 receives raw navigational data and processes the data into a format that can be used by a navigational data system (e.g., navigational data system 100) to generate a combined navigational dataset (e.g., combined navigational dataset 122).

The data processing system 300 includes a exchange model parser 302, a non-temporal data verifier 304, and a temporal data verifier 306. The data processing system 300 receives cyclical navigational source data 310, AIXM navigational data 312 and temporal notices 314. Finally, the data processing system generates cyclical navigational data 112 and temporal data 114.

The cyclical navigational source data 310 can comprise the cyclical data provided by countries according to AIRAC standard. As such, the cyclical navigational source data 310 would provide information related to aeronautical features, updated on 28 day cycles. The temporal notices 314 can include a variety of temporal navigational elements, including NOTAMs issued to alert pilots of temporary conditions. Such NOTAMs would typically include information regarding a condition or feature, along with a start and end date and time. The AIXM navigational data 312 can provide aeronautical information in Aeronautical Information Exchange Model (AIXM) format. This format enables a variety of types of data to be shared, including both cyclical and temporal data. For example, the AIXM format facilitates a variety of navigational data published by different countries and organizations. It should also be noted that the AIXM format facilitates the use of digital NOTAMs. Such digital NOTAMs, like traditional NOTAMs but in structured format, can include information regarding a condition or feature, along with a start and end date and time.

It should be noted that while FIG. 3 illustrates the data processing system 300 receiving data from three separate sources, i.e., the cyclical navigational source data 310, AIXM navigational data 312 and temporal notices 314, that this is just one example. In other embodiments the data processing system 300 could receive fewer or more sources of data. For example, the data processing system 300 could instead only receive cyclical navigational data from either the cyclical navigational source data 310 or the AIXM navigational data 312.

In the example of FIG. 3, the exchange model parser 302 receives data from the AIXM navigational data 312 and the temporal notices 314. In general, the parser 302 is configured to split the AIXM navigational data 312 and the temporal notices 314 into temporal data and non-temporal data. The non-temporal data is provided to the non-temporal data verifier 304, while the temporal data is provided to the temporal data verifier 306. In general, the non-temporal data verifier 304 and the temporal data verifier 306 verifies and validates the data for structural, relational, and logical consistency. The verification and validation done by non-temporal data verifier 304 can be based on pre-defined data structure for non-temporal data. The verification and validation done by temporal data verifier 306 can likewise be based on pre-defined data structure for temporal data.

Finally, the verified and validated data provided by the non-temporal data verifier 304 and the temporal data verifier 306 are outputted as the cyclical navigational data 112 and temporal data 114. As such, the cyclical navigational data 112 and temporal data 114 can be used to generate the combined navigational dataset as described above. The combined navigational dataset can then be provided to the FMS. With the FMS loaded with both cyclical and temporary data, the pilot can be provided with both comprehensive and up to date aeronautical information.

Figure 4:
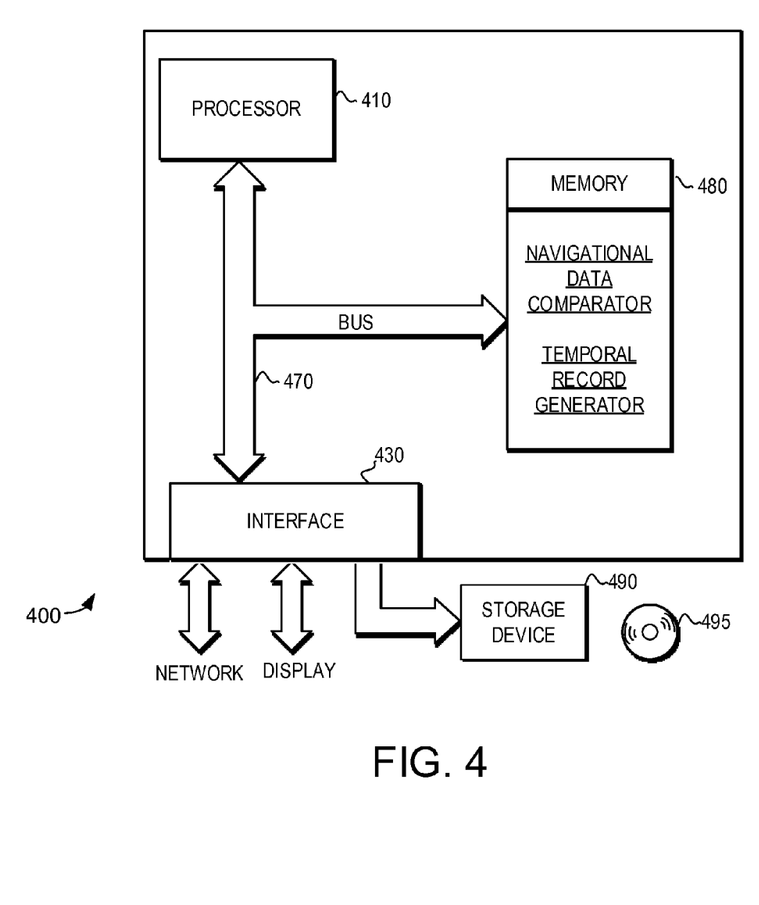
FIG. 4 is a schematic diagram of an exemplary processing system in accordance with an exemplary embodiment.

The navigational data comparator, temporal record generator, and other associated elements and datasets can be can be implemented on a wide variety of platforms. Turning now to FIG. 4, an exemplary processing system 400 is illustrated. Processing system 400 illustrates the general features of a processing system that can be used to implement the invention. Of course, these features are merely exemplary, and it should be understood that the invention can be implemented using different types of hardware that can include more or different features. It should be noted that the processing system 400 can be implemented in many different environments, such as part of large networked computer system that spans multiple sites or as discrete individual computer system. The exemplary processing system 400 includes a processor 410, an interface 430, a storage device 490, a bus 470 and a memory 480. In accordance with the embodiments of the invention, the memory 480 includes at least a navigational data comparator program module and a temporal record generator program module.

The processor 410 performs the computation and control functions of the system 400. The processor 410 may comprise any type of processor, include single integrated circuits such as a microprocessor, or may comprise any suitable number of integrated circuit devices and/or circuit boards working in cooperation to accomplish the functions of a processing unit. In addition, processor 410 may comprise multiple processors implemented on separate systems. In addition, the processor 410 may be part of an overall larger computer system. During operation, the processor 410 executes the programs contained within memory 480 and as such, controls the general operation of the processing system 400.

Memory 480 can be any type of suitable memory. This would include the various types of dynamic random access memory (DRAM) such as SDRAM, the various types of static RAM (SRAM), and the various types of non-volatile memory (PROM, EPROM, and flash). It should be understood that memory 480 may be a single type of memory component, or it may be composed of many different types of memory components. In addition, the memory 480 and the processor 410 may be distributed across several different physical devices that collectively processing system 400. For example, a portion of memory 480 may reside on one computer system, and another portion may reside on a second computer system.

The bus 470 serves to transmit programs, data, status and other information or signals between the various components of processing system 400. The bus 470 can be any suitable physical or logical means of connecting computer systems and components. This includes, but is not limited to, direct hard-wired connections, fiber optics, infrared and wireless bus technologies. It should also be noted that the processing system 400 could be implemented as a single system on a chip (SoC). In such a case the bus 470 can comprise the internal bus of the SoC.

The interface 430 allows communication to the processing system 400, and can be implemented using any suitable method and apparatus. It can include a network interfaces to communicate to other systems, terminal interfaces to communicate with technicians, and storage interfaces to connect to storage apparatuses such as storage device 490. Storage device 490 can be any suitable type of storage apparatus, including direct access storage devices such as hard disk drives, flash systems, floppy disk drives and optical disk drives. As shown in FIG. 4, storage device 490 can comprise a disc drive device that uses discs 495 to store data.

In accordance with the embodiments described herein, the processing system 400 implements a navigational data comparator and a temporal record generator. In other embodiments, the processing system 400 could also implement a temporal dataset refresher, a navigational dataset combiner, a non-temporal dataset refresher. In yet other embodiments, the processing system 400 could also implement an exchange model parser, a non-temporal data verifier, and a temporal data verifier. Thus during operation, these elements can be implemented by storing associated program modules in the memory 480 to be executed by processor 410. When being executed by the processor 410, these programs generate a combined navigational dataset that can be provided to aircraft flight management systems.

It should be understood that while the present invention is described here in the context of a fully functioning computer system, those skilled in the art will recognize that the mechanisms of the present invention are capable of being distributed as a program product in a variety of forms, and that the embodiments described herein apply equally regardless of the particular type of recordable media used to carry out the distribution. Examples of recordable media include: magnetic disks, flash memory devices, hard drives, memory cards and optical disks (e.g., disk 495).

The foregoing description of specific embodiments reveals the general nature of the inventive subject matter sufficiently that others can, by applying current knowledge, readily modify and/or adapt it for various applications without departing from the general concept. Therefore, such adaptations and modifications are within the meaning and range of equivalents of the disclosed embodiments. The inventive subject matter embraces all such alternatives, modifications, equivalents, and variations as fall within the spirit and broad scope of the appended claims.

The forgoing detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

For the sake of brevity, conventional techniques related to aircraft data communication systems, and other functional aspects of certain systems and subsystems (and the individual operating components thereof) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter. Although not always required, the techniques and technologies described here are suitable for use by any aircraft, ground control system, or other communication system.

What is claimed is:

1. An apparatus comprising:
   a processor;
   a memory coupled to the processor; and a program residing in the memory and being executed by the processor, the program including:
a navigational data comparator module, the navigational data comparator module configured to receive cyclical navigational data and temporal data, the navigational data comparator module configured to compare temporal navigational elements in the temporal data to the cyclical navigational data to determine if the temporal navigational elements are new, extending, or ending; and
a temporal record generator module, the temporal record generator module coupled to the navigational data comparator module and configured to create temporal records from the temporal navigational elements, the created temporal records including: a temporal record for a temporal period for each new temporal navigational element, a temporal record for a current cycle and a temporal record for the temporal period for each extending temporal navigational element, and a temporal record for the current cycle for each ending temporal navigational element.

2. The apparatus of claim 1, wherein the cyclical navigational data comprises Aeronautical Information Regulation and Control (AIRAC) data, and wherein the temporal data comprises Notice to Airman (NOTAMs).

3. The apparatus of claim 1, wherein the current cycle is a 28 day cycle.

4. The apparatus of claim 1, wherein the navigational data comparator module is configured to compare temporal navigational elements in the temporal data to the cyclical navigational data by comparing features in the temporal navigational elements with features in the cyclical navigational data, and wherein the created temporal records correspond to the compared features.

5. The apparatus of claim 1, wherein the navigational data comparator module is further configured to check for specified event scenarios in the temporal data, and wherein the comparing the temporal navigational elements with the cyclical navigational data comprises comparing features corresponding to the specified events.

6. The apparatus of claim 1, wherein the navigational data comparator module is configured to compare temporal navigational elements in the temporal data to the cyclical navigational data over a date range corresponding to the temporal period.

7. The apparatus of claim 1, wherein the navigational data comparator module is configured to compare temporal navigational elements in the temporal data to the cyclical navigational data for a specified geographic area.

8. The apparatus of claim 1, further comprising a temporal dataset refresher module, the temporal dataset refresher configured module to receive the temporal records and generate a temporal navigational dataset from the temporal records, where the temporal navigational dataset comprises data for the current cycle and the temporal period.

9. The apparatus of claim 8, further comprising a non-temporal dataset refresher module, the non-temporal dataset refresher module configured to receive the cyclical navigational data and generate a non-temporal navigational dataset from the cyclical navigational data, where the non-temporal navigational dataset comprises data for a previous cycle and the current cycle.

10. The apparatus of claim 9, further comprising a navigational dataset combiner module, the navigational dataset combiner module configured to receive the non-temporal navigational dataset and the temporal navigational dataset and merge the non-temporal navigational dataset and the temporal navigational dataset to generate a combined navigational dataset, with each navigational data element in the combined navigational dataset including a corresponding cycle indicator to indicate if the navigational data element corresponds to the previous cycle, the current cycle, or the temporal period.

11. A system for generating datasets for flight management systems, the system comprising:
a processor;
a memory coupled to the processor; and
a program residing in the memory and being executed by the processor, the program including:
a navigational data comparator, the navigational data comparator configured to receive cyclical navigational data and a plurality of temporal data, each of the plurality of temporal data including a temporal navigational event, the navigational data comparator configured to compare specified features of the temporal navigational elements in the temporal data to the specified features of the cyclical navigational data to determine if the temporal navigational elements are new for a temporal period, extending to the temporal period, or ending before the temporal period;
a temporal record generator, the temporal record generator configured to create temporal records, the created temporal records including:
a temporal record only for the temporal period for new temporal navigational elements;
a temporal record valid for a current cycle previous to the temporal period and a temporal record for the temporal period for extending temporal navigational elements; and
a temporal record only for the current cycle for ending temporal navigational elements;
a temporal dataset refresher, the temporal dataset refresher configured to receive the created temporal records and generate a temporal navigational dataset from the temporal records, where the temporal navigational dataset comprises data for the current cycle and the temporal period;
a non-temporal dataset refresher, the non-temporal dataset refresher configured to receive the cyclical navigational data and generate a non-temporal navigational dataset from the cyclical navigational data, where the non-temporal navigational dataset comprises data for a previous cycle and the current cycle; and
a navigational dataset combiner, the navigational dataset combiner configured to receive the non-temporal navigational dataset and the temporal navigational dataset and merge the non-temporal navigational dataset and the temporal navigational dataset to generate a combined navigational dataset, with each navigational data element in the combined navigational dataset including a corresponding cycle indicator to indicate if the navigational data element corresponds to the previous cycle, the current cycle, or the temporal period, and wherein the combined navigational dataset is formatted for delivery to a flight management system (FMS) aboard an aircraft.

12. A method comprising :
providing cyclical navigational data and temporal data, the temporal data including temporal navigational elements;
comparing the temporal navigational elements in the temporal data to the cyclical navigational data;

determining if the temporal navigational elements are new, extending or ending based on the comparing;

creating temporal records for a temporal period for new temporal navigational elements;

creating temporal records for a current cycle previous to the temporal period and temporal records for the temporal period from the temporal data for extending temporal navigational elements; and creating temporal records for the current cycle for ending temporal navigational elements.

13. The method of claim 12, wherein the providing cyclical navigational data comprises providing Aeronautical Information Regulation and Control (AIRAC) data, and wherein the providing temporal data comprises providing Notice to Airman (NOTAM).

14. The method of claim 12, wherein the comparing the temporal navigational elements in the temporal data to the cyclical navigational data comprises comparing specified features corresponding to specified events in the temporal navigational elements and the cyclical navigation data.

15. The method of claim 12, wherein comparing the temporal navigational elements in the temporal data to the cyclical navigational data comprises comparing the temporal navigational elements over a date range corresponding to the temporal period.

16. The method of claim 12, wherein comparing the temporal navigational elements in the temporal data to the cyclical navigational data comprises comparing for a specified geographic area.

17. The method of claim 12, further comprising generating a temporal navigational dataset from the temporal records, where the temporal navigational dataset comprises data for the current cycle and the temporal period.

18. The method of claim 17, further comprising generating a non-temporal navigational dataset from the cyclical navigational data, where the non-temporal navigational dataset comprises data for the previous cycle and the current cycle.

19. The method of claim 18, further comprising combining the non-temporal navigational dataset and the temporal navigational dataset to generate a combined navigational dataset, with each navigational data element in the combined navigational dataset including a corresponding cycle indicator to indicate if the navigational data element corresponds to the previous cycle, the current cycle, or the temporal period.

20. The method of claim 19, further comprising delivering the combined navigational dataset to a flight management system (FMS) aboard an aircraft.

* * * * *

UNITED STATES PATENT AND TRADEMARK OFFICE
CERTIFICATE OF CORRECTION

PATENT NO. : 9,646,501 B2  
APPLICATION NO. : 14/799097  
DATED : May 9, 2017  
INVENTOR(S) : Idupunur et al.

It is certified that error appears in the above-identified patent and that said Letters Patent is hereby corrected as shown below:

In the Claims

Column 11, Line 52, "configured module" should be changed to --module configured--

Signed and Sealed this  
First Day of August, 2017

Joseph Matal  
*Performing the Functions and Duties of the*  
*Under Secretary of Commerce for Intellectual Property and*  
*Director of the United States Patent and Trademark Office*